June 17, 1941.  H. C. DAVIS  2,245,966
LIQUID LEVEL CONTROL
Filed April 7, 1939
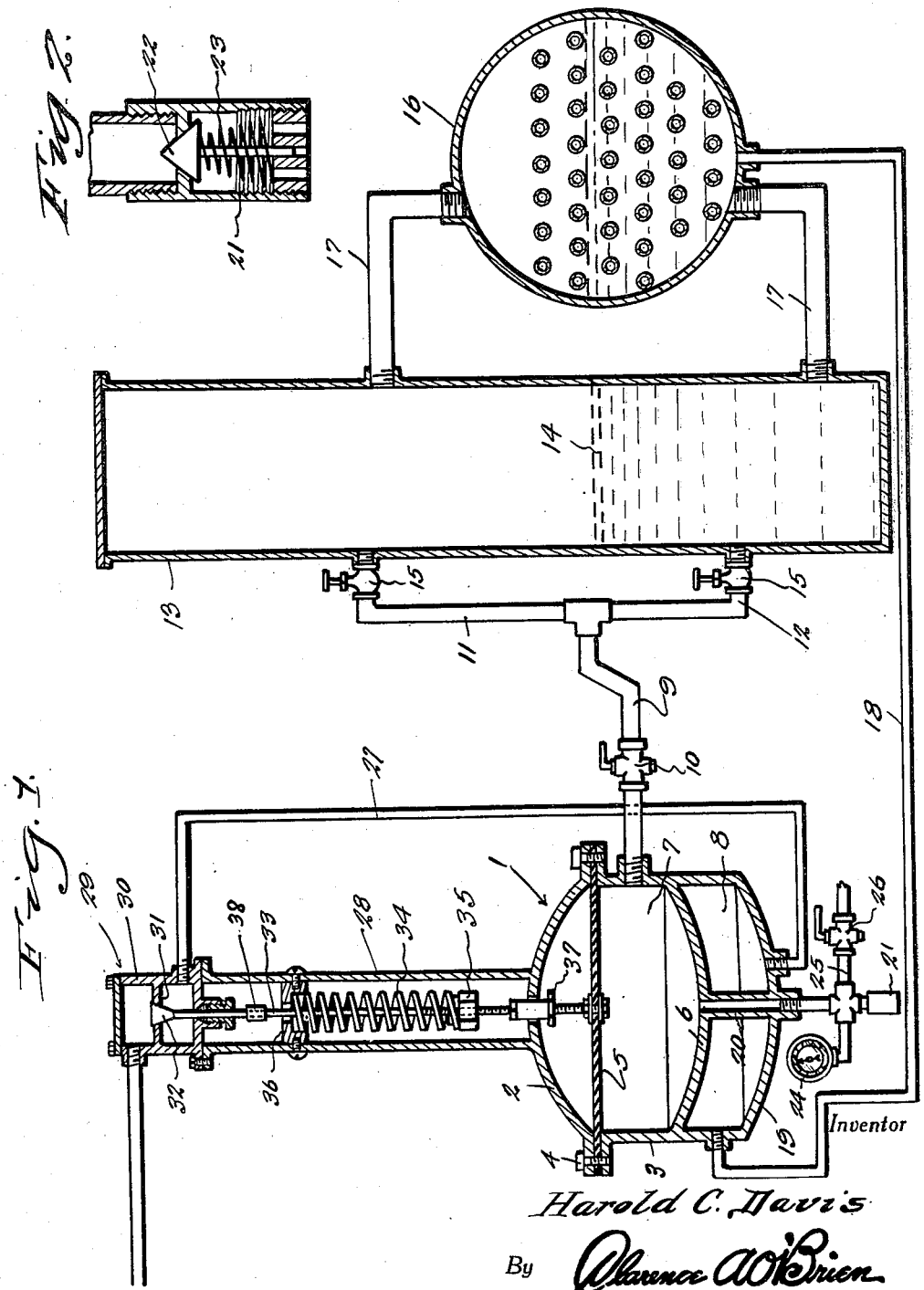
Inventor
Harold C. Davis
By Clarence A. O'Brien
and Hyman Berman
Attorneys Patented June 17, 1941

2,245,966

UNITED STATES PATENT OFFICE 2,245,966

LIQUID LEVEL CONTROL

Harold Clinton Davis, Clarkwood, Tex.

Application April 7, 1939, Serial No. 266,660

5 Claims. (Cl. 137—68)

The present invention relates generally to new and useful improvements in liquid level control means and has for its primary object to provide, in a manner as hereinafter set forth, an apparatus comprising a novel construction, combination and arrangement of parts for automatically controlling liquid levels of volatile hydrocarbons or other low boiling, high vapor pressure liquid, during their manufacture under pressure in commercial quantity.

Other objects of the invention are to provide a liquid level control of the character described which will be comparatively simple in construction, highly efficient and reliable in operation, compact and which may be manufactured and installed at low cost.

All of the foregoing and still further objects and advantages of the invention will become apparent from a study of the following specification, taken in connection with the accompanying drawing wherein—

Figure 1 is a vertical sectional view, showing a liquid level control constructed in accordance with the present invention operatively connected with a fractionating column and reboiler of a plant for the treatment of hydrocarbons.

Figure 2 is a detail view in vertical section through the vapor relief valve.

Referring now to the drawing in detail, it will be seen that the embodiment of the invention which has been illustrated comprises a casing of suitable metal which is designated generally by the reference numeral 1. The casing 1 includes upper and lower sections 2 and 3, respectively, which are detachably secured together, as at 4. A diaphragm 5 in the upper portion of the casing 1 has its marginal portions secured between the sections 2 and 3. A partition 6 is provided in the lower casing section 3 in a manner to form upper and lower chambers 7 and 8, respectively. Connected at one end with the upper chamber 7 is a conduit 9 having interposed therein a regulating valve 10. The other end of the conduit 9 is connected by branches 11 and 12 to a conventional fractionating column 13 at vertically spaced points. Attention is here invited to the fact that the intake end of the conduit 9 is at the level at which it is desired to maintain the liquid, as at 14. Valves 15 are provided at the intake ends of the branches 11 and 12. The reference numeral 16 designates a reboiler which is connected in the usual manner, as at 17, to the fractionating column 13 at vertically spaced points. This reboiler being connected in the usual manner with a supply tank which keeps the column and reboiler supplied with liquid and the vapors are led from the member 16 in the usual manner.

A pipe 18 connects the reboiler 16, and consequently the fractionating column 13, with the lower chamber 8 of the casing 1. Extending between the partition 6 and the bottom 19 of the casing 1 is a conduit 20. It will be observed that the conduit 20 communicates with the upper chamber 7. The reference numeral 21 designates a relief valve which communicates with the upper chamber 7 through the conduit 20. As seen in Fig. 2 of the drawing, the embodiment of vapor relief valve which has been shown comprises a head 22 which is seated by a spring 23. Also communicating with the chamber 7 through the conduit 20 is a suitable pressure gauge 24. The reference numeral 25 designates a vapor discharge pipe which communicates with the chamber 7 through the conduit 20 and which is regulated through the medium of a valve 26.

The reference numeral 27 designates a liquid outlet pipe line which is connected, at one end, to the lower chamber 8. Rising from the casing 1 is a tubular housing 28 having mounted thereon a valve which is designated generally by the reference numeral 29, said valve 29 being interposed in the pipe line 27 for controlling same. The valve 29 includes a casing 30 having a ported partition 31 therein formed to provide a seat for the head 32. The head 32 is on the upper end of a stem 33 which has its lower end connected to the diaphragm 5 for actuation thereby. A coil spring 34 in the housing 28 has one end engaged with an adjusting nut 35 on the stem 33 and its other end engaged with a stop 36 for normally maintaining the valve 29 closed. Adjustably mounted on the lower portion of the stem 33 is a stop 37. The stem 33 includes sections connected by a coupling 38 through the medium of which said stem may be adjusted longitudinally.

It is thought that the operation of the invention will be readily apparent from a consideration of the foregoing, particularly to those skilled in the art to which the device pertains. When the level of liquid in the members 13 and 16 lowers to a point where vapor from said members can pass into the pipe 9, such vapors will pass through the orifice of valve 10 into the chamber 7 and pass through the conduit 20 into pipe 25 and through the orifice of valve 26 to discharge and as the valves 10 and 26 are adjusted to have the same size orifice the vapors or gases will simply pass directly through the chamber 7 without accumulating in the chamber 7 to apply any pressure to the diaphragm 5 so the valve 32 remains closed under the action of the spring 34. Of course, the fluid in the members 13 and 16 is under considerable pressure as these members are in communication with the large supply tank and any pressure above that necessary to raise diaphragm 5 occurring in the chamber 7 will open the safety valve 21 and thus the diaphragm 5 will not be injured. As the liquid level rises in the members 13 and 16 some of the liquid will pass through the pipe 9 and valve 10 into the chamber 7 and due to the throttling action of valve 10 as well as the heat from the liquid in chamber 8, the liquid entering the chamber 7 will flash into vapor and this vapor suddenly produced will raise the diaphragm 5 and open the valve 32 so that some of the liquid can pass from the system through the pipe 18, chamber 8, pipe 27 and valve casing 30 and the pipe connected with said casing. The vapor suddenly produced in the chamber 7 causes a movement of the diaphragm 5 before the pressure can pass through the valve 26. The liquid level continues to drop until the vapor again enters the pipe 9 and flows into the chamber 7 and passes from the chamber through pipe 25 and valve 26. The operation of the device is usually such as to keep the liquid in chamber 8 hot enough to cause liquid entering chamber 7 to vaporize suddenly but in some cases, such as when producing butane the reduced pressure to which the liquid is subjected by the throttling valve 10 will be sufficient to vaporize it without heat and in some cases, where necessary, a heating medium from any suitable source can be circulated through the chamber 8 and if desired or required the chamber may be insulated.

It is believed that the many advantages of a liquid level control constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. A liquid level control comprising, in combination with a container having therein a vapor generating liquid under pressure, an outlet connected with the container for lowering the level of the liquid therein, a valve controlling the outlet, pressure responsive means including a chamber connected with the container for alternately receiving vapors and liquid therefrom as the level of said liquid drops and rises in said container, the valve being connected with said pressure responsive means for actuation to open position thereby, throttling means for the liquid entering the chamber to cause the liquid to vaporize and exhaust means on the chamber for exhausting vapors from the chamber as fast as they flow thereinto from the container but such exhaust means preventing the vapors from escaping as fast as the liquid entering the chamber is vaporized.

2. A liquid level control comprising, in combination with a container having therein a vapor generating liquid under pressure, an outlet pipe connected with the container for lowering the level of the liquid therein, a valve for controlling said outlet pipe, a casing, a pipe connecting the casing with an intermediate part of the container for admitting liquid to the casing when the liquid level in the container is above the pipe and said pipe admitting vapor to the casing when the liquid level is below said pipe, exhaust means connected with the casing for exhausting vapors therefrom as fast as they enter from the pipe, a diaphragm mounted in the casing and operatively connected to the valve for opening same, throttling means in the last-mentioned pipe whereby when liquid flows past the throttling means reduction of pressure thereof causes it to vaporize, the exhaust means preventing the vapors from escaping as fast as the liquid entering the chamber is vaporized, whereby the vaporized liquid causes the diaphragm to open the valve in the outlet pipe and means for heating the liquid to increase the vaporizing action.

3. A liquid level control comprising, in combination with a container having a vapor generating liquid therein under pressure, an outlet pipe connected with the container for lowering the level of the liquid therein, a valve for controlling said outlet pipe, a casing, a second pipe connecting the casing with an intermediate part of the container for admitting liquid to the casing when the liquid level in the container is above the pipe and said pipe admitting vapor to the casing when the liquid level is below said pipe, a throttling valve in said second pipe for throttling the liquid, thereby causing it to be vaporized, a diaphragm mounted in the casing and operatively connected to the valve for opening same, said vaporization of the liquid causing the diaphragm to open the valve, and discharge means including a regulating valve adjusted to permit vapors to exhaust from the chamber as fast as the vapors flow into the chamber from the container, and to prevent the vapors from escaping as fast as the liquid entering the chamber is vaporized.

4. A liquid level control for hydrocarbon treating plants which includes a container and a boiler connected therewith, a discharge pipe leading from the boiler, a valve controlling the pipe, a casing, a diaphragm therein, means for connecting the diaphragm to the valve to open the valve when the diaphragm is actuated by pressure, a second pipe connecting the chamber at one side of the diaphragm to the container, said second pipe connecting with the container at an intermediate part whereby when the level of liquid in the container reaches the pipe liquid will flow through the pipe into the casing and when the level of liquid is below the pipe vapor will enter the casing, a throttling valve in said pipe for throttling the liquid passing to the casing to vaporize the same, a discharge pipe connected with the casing, a regulating valve therein, the valves being adapted to be set to permit vapor to flow from the casing as fast as it enters the same from the container but said regulating valve preventing the vapors from the liquid escaping as fast as the liquid entering the chamber is vaporized.

5. A liquid level control for hydrocarbon treating plants which includes a container and a boiler connected therewith, a discharge pipe leading from the boiler, a valve controlling the pipe, a casing, a diaphragm therein, means for connecting the diaphragm to the valve to open the valve when the diaphragm is actuated by pressure, a second pipe connecting the chamber to one side of the diaphragm to the container, said second pipe connecting with the container at an intermediate part whereby when the level of liquid in the container reaches the pipe liquid will flow through the pipe into the casing and when the level of liquid is below the pipe vapor will enter the casing, a throttling valve in said pipe for vaporizing the liquid passing through the said pipe, a discharge pipe connected with the casing, a regulating valve therein, the valves being adapted to be set to permit vapor to flow from the casing as fast as it enters the same from the container but said regulating valve preventing the vapors from the throttled liquid escaping as fast as the liquid entering the casing is vaporized, means for subjecting the liquid to heat to quicken vaporization of the same and a safety valve connected with the casing.

HAROLD CLINTON DAVIS.